United States Patent [19]

Ohmi et al.

[11] Patent Number: 5,106,503

[45] Date of Patent: Apr. 21, 1992

[54] ULTRA-PURE WATER SUPPLY PIPING SYSTEM

[75] Inventors: Tadahiro Ohmi, 1-17-301, Komegabukuro 2-chome, Aoba-ku, Sendai Miyagi-ken 980; Tetsuo Mizuniwa, Kawasaki, both of Japan

[73] Assignee: Tadahiro Ohmi, Sendai, Japan

[21] Appl. No.: 566,449

[22] PCT Filed: Mar. 11, 1989

[86] PCT No.: PCT/JP89/00267

§ 371 Date: Aug. 22, 1990

§ 102(e) Date: Aug. 22, 1990

[30] Foreign Application Priority Data

Mar. 11, 1988 [JP] Japan .................... 63-58878

[51] Int. Cl.$^5$ ............................................. B01D 61/20
[52] U.S. Cl. ...................................... 210/541; 210/542
[58] Field of Search ............... 210/195.1, 195.2, 257.2, 210/321.6, 321.72, 541, 542; 137/154, 561 R, 563, 565, 566, 567, 571, 568, 575, 576, 583, 590, 593, 625.28, 625.29

[56] References Cited

U.S. PATENT DOCUMENTS 4,216,185 8/1980 Hopkins ........................ 210/195.1
4,595,498 6/1986 Cohen et al. .................. 210/195.1

FOREIGN PATENT DOCUMENTS 61-4587 1/1986 Japan .
63-283788 11/1988 Japan .

OTHER PUBLICATIONS

Japanese Publication-Science Forum.
Ultra Pur Water Supply System, Chemical Engineering (1987) vol. 32, No. 2.

Primary Examiner—Frank Sever
Attorney, Agent, or Firm—Baker & Daniels

[57] ABSTRACT

The ultra-pure water piping system of this invention comprises an inward pipe passing by a series of ultra-pure water using units and running toward the end, an inward pipe running approximately in parallel to said outward pipe and forming the flow of the same direction as said outward pipe, a plurality of connection pipes running from said outward pipe toward said inward pipe, a branching pipe running from said connection pipe to the ultra-pure water using units, and a branching valve to adjust water quantity flowing in the branching pipe, and it is characterized in that said outward pipe is installed at higher position than said inward pipe, and said plurality of connection pipes are used to connect said outward pipe with said inward pipe installed at different height.

10 Claims, 2 Drawing Sheets

ULTRA-PURE WATER SUPPLY PIPING SYSTEM

BACKGROUND OF THE INVENTION

1. Technical Field

The present invention relates to a supply piping system for ultra-pure water to be used in large quantity in electronics industry for semiconductor products, biotechnology and pharmaceutical and medical industry.

2. Technical Background

The system according to this invention is applied widely in various industrial fields. Here, description will be given on the ultra-pure water piping system for electronics industry including the manufacture of semiconductor integrated circuits.

In recent years, ultra-pure water for electronics industry is produced by ultra-pure water producing system as shown in FIG. 3, and water is mostly supplied to the equipment to use ultra-pure water (may be called "use point" hereinafter, referring to the place to use ultra-pure water) through a piping system. In FIG. 3, an ultra-pure water supply piping system having 3 use points is shown as an example. In normal system, the number of the use points is far more than this. In FIG. 3, the primary pure water producing system is not shown.

In the following, description is given on the ultra-pure water manufacture and ultra-pure water supply to the use points in connection with FIG. 3. Key points to maintain water quality of ultra-pure water are the removal of dust and solid particles, removal of bacteria, and complete removal of various ions, silica, organic substances, etc. dissolved in water. In FIG. 3, primary pure water is supplied to a circulating water tank 102 through a primary pure water supply pipe 101. The primary pure water stored in the circulating water tank is pressurized by the pressure pump 103 and is purified by passing through an ultraviolet sterilizing unit (UV sterilizing unit) 104, a cartridge polishers 105, 106 and 107 and ultrafiltration units 108 and 109. 122 is a drain pipe of the ultrafiltration unit. The ultra-pure water thus purified is supplied to the use points 119, 120 and 121 through outward pipe 110, connection pipes 113, 114 and 115, and branching valves 116, 117 and 118 respectively. The ultra-pure water passing through the connection pipes 113, 114 and 115 are returned to the circulating water tank 102 through the inward pipe 112, and the circulation is repeated.

FIG. 4 is an emphasized view of an ultra-pure water supply piping system of FIG. 3. 201 comprehensively shows the ultra-pure water producing system. 131, 132 and 133 are the branching points of the connection pipes 113, 114 and 115 to the use points. The branching valves 116, 117 and 118 are integrated with the branching points 131, 132 and 133 respectively.

For the piping material, macromolecular materials such as clean vinyl chloride, PVDF, PEEK, etc. having circular and smooth surface and containing few contaminants in ultra-pure water are used. As the piping material with lowest dissolving ratio of contaminants, stainless steel pipe is used, which is produced by electropolishing the inner surface, by cleaning and drying thereafter and having passive film through oxidation in ultra-high purity oxygen at 500°–600° C. for 5–10 hours—particularly the passive film mainly consisting of $Cr_2O_3$. Above all, the surface oxidized at 550° C. for more than 9 hours has excellent property.

The supply piping system to the use points are provided with an outward pipe and an inward pipe as shown in FIGS. 3 and 4, and the connection pipes to the use points are furnished between them. The reasons are as follows: In FIGS. 3 and 4, only 3 use points are shown, whereas the number of the use points are normally far more than that. Therefore, the quantity of ultra-pure water flowing in the outward pipe is gradually decreased, and the quantity of water in the inward pipe is gradually increased. However, regardless of the using condition of each use point, the predetermined quantity of ultra-pure water is supplied to the use points from each connection pipe. Namely, the same quantity of water flows in the connection pipe upstream of the outward pipe and in the connection pipe downstream of it, and the pressure difference between outward pipe and inward pipe of each connection pipe is the same regardless of the position of the connection pipe. This results in the decrease of both circular pressure in outward pipe and circular pressure in inward pipe as it goes toward downstream, whereas the pressure difference between them is maintained at constant level. Therefore, the ultra-pure water supplied to the use points should be only the water passing through the outward pipe. This is the so-called reverse return type ultra-pure water supply piping system. When ultra-pure water is supplied to the use points, the branching valves 116, 117 and 118 should be opened.

In the conventional type ultra-pure water supply piping system as described above, the outward pipe and the inward pipe of ultra-pure water supply piping system in a clean room for semiconductor manufacture are arranged in parallel to each other at the same height in an underfloor pit room or in a service area. For this reason, no means were provided to cause a pressure difference between outward pipe and inward pipe.

This causes the following problems: In FIG. 4, outward pipe 110 and inward pipe 112 are conventionally at almost the same height, and the connection pipes 113, 114 and 115 are composed of the pipes with the same inner diameter for upstream and downstream of the branching point. Further, when the branching valves 116, 117 and 118 are opened, the pressure at the branching points 131, 132 and 133 are approximately equal to the atmospheric pressure. Accordingly, in case the branching valve 117 is opened when ultra-pure water is used in the ultra-pure water using equipment 120, the pressure at the branching point 132 is approximately equal to the atmospheric pressure. On the other hand, the pressure of ultrapure water flowing in outward pipe and inward pipe is adjusted in such manner that it is by approximately 1 to 2 $kg/cm^2$ higher than the atmospheric pressure. Therefore, there occurs a flow passing from outward pipe 110 to the branching point 132 and a flow from the inward pipe 112 to the branching point 132 in the connection pipe, and these flows are mixed together and are supplied to the ultra-pure water using equipment. Ultra-pure water flowing from inward pipe to the branching point 132 is the ultra-pure water, which has come through the other connection pipes 113 and 115 and the inward pipe. Thus, it contains more impurities than the ultra-pure water, which has come from outward pipe through the connection pipe 114-1 only, because impurities are eluted from piping materials.

For instance, when water quality is expressed by electric resistivity, which is an index for concentration of ionic impurities contained in ultra-pure water, the resistivity of ultra-pure water supplied to ultra-pure water using equipment 120 flowing from outward pipe 110 through the connection pipe 114-1 only is 18.2 MΩ.cm, while the resistivity of water supplied to the ultra-pure water equipment 120 from inward pipe through the connection pipe 114-2 is sometimes about 18.0 MΩ.cm. The difference of the resistivity 0.2 MΩ.cm corresponds to the concentration difference of about 0.2 ppb if the impurities are sodium ions. In other words, conventional type ultra-pure water supply piping system is disadvantageous in that it cannot supply ultra-pure water of ultra-high purity.

As described above, it is not desirable that ultra-pure water containing a large quantity of impurities is supplied by ultra-pure water using equipment due to the reverse flow from inward pipe. It is an object of this invention to offer a piping system, which prevents the reverse flow from inward pipe to ultra-pure water using equipment and stably supplied ultra-pure water of ultra-high purity.

DISCLOSURE OF THE INVENTION

The ultra-pure water supply piping system according to this invention comprises an outward pipe running from the final purification equipment of ultra-pure water toward the end of the piping passing by a series of ultra-pure water using equipment, an inward pipe running approximately in parallel with the outward pipe and forming the flow of the same direction as the outward pipe, a plurality of connection pipes running from the outward pipe toward the inward pipe, a branching pipe running from the connection pipes toward the ultra-pure water using equipment, and a branching valve to adjust water quantity flowing to the branching pipe, and it is characterized in that the outward pipe is furnished at the position higher than the inward pipe, and that the plurality of connection pipes are used to connect between the outward pipe and the inward pipe at different height.

OPERATION

Figure 1:
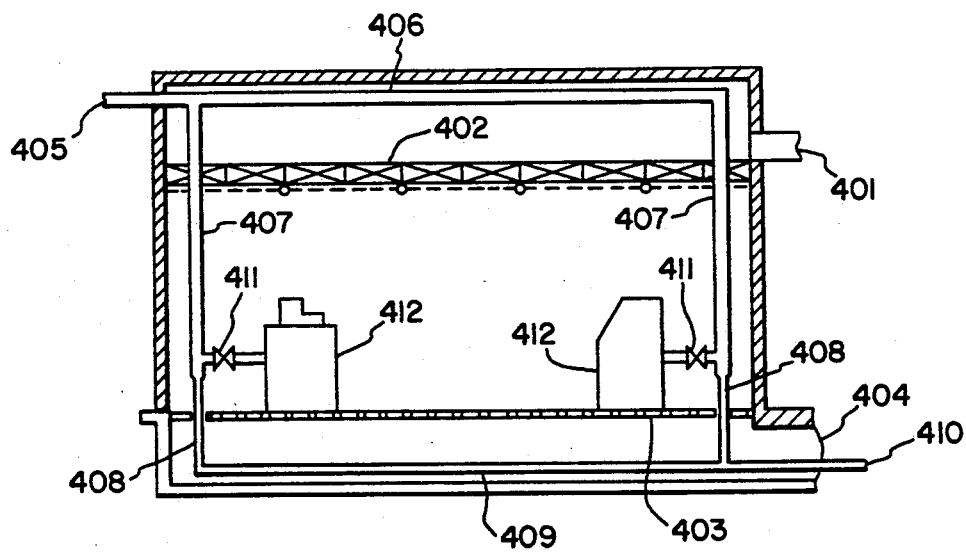
FIG. 1 is a schematical sectional view showing an embodiment of this invention.

In order to give positive pressure difference between outward pipe and inward pipe and to pass the ultra-pure water flowing in the connection pipe from outward pipe to inward pipe at all times, it is effective to install the outward pipe at higher position and to install the inward pipe at lower position. If the outward pipe is installed at the ceiling of clean room and the inward pipe is installed at underfloor clean pit of the clean room, and if a branching point is furnished from the connection pipe connecting these pipes toward ultra-pure water using equipment, it is easy to provide the height difference of about 3–4 m between outward pipe and inward pipe because the height of the clean room is usually about 3 m.

In other words, the sum of the pressure of outward pipe and the water head between the branching point and the outward pipe is the pressure of the branching point, and the water head between the branching point and the outward pipe can be designed at almost contact value regardless of the position of the using points. Accordingly, it is effective in equalizing the pressure at the branching point, and the pressure required for the ultra-pure water using equipment can be kept at the branching point.

Method to Calculate Flow Rate and Pressure Loss

In the following, description is given on the method to calculate the pressure loss between pipe inlet and outlet if water quantity flowing in pipe, pipe diameter, pipe length and physical properties of water are given. Also, description is given on the method to calculate the quantity of water flowing in the pipe when pressure loss at pipe inlet and outlet, pipe diameter, pipe length and physical properties of water are given. The equations (1), (2) and (3) are those to obtain the pressure loss, and the equations (4), (5) and (6) are those to obtain the flow rate.

(1) Method to obtain pressure loss when fluid flows in pipe:

$$\Delta P = 4f(\rho u^2 / 2g_c)(l/D) \quad (1)$$

$$f = 0.0785/\{0.7 - 1.65 \log Re + (\log Re)^2\} \quad (2)$$

$$Re = D u \rho / \mu \quad (3)$$

(2) Method to obtain flow rate from pressure loss:

$$Re f^{\frac{1}{2}} = 2.22 \{\rho D^3 \Delta P / (l \mu^2)\}^{\frac{1}{2}} \quad (4)$$

Diagram for relationship between $Ref^{\frac{1}{2}}$ and $f \rightarrow$ to obtain Re   (5)

$$Q = Re \mu D \pi / 4 \rho \quad (6),$$

where
ΔP: Pressure loss [kg/cm²]
Q: Flow rate [m³/s]
f: Resistance coefficient
Re: Reynold's number
ρ: Density [kg/m³]
D: Pipe diameter [m]
u: Flow velocity [m/s]
l: Pipe length [m]
$g_c$: Gravitational conversion factor [kg.m/kg.s²]
μ: Viscosity [kg/m.s]

Calculation Example

Figure 2:
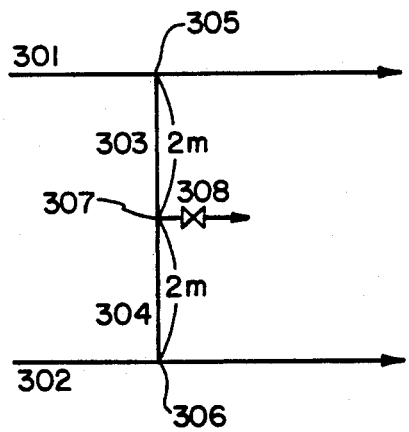
FIG. 2 is a schematical drawing of a part of the piping system.
Figure 3:
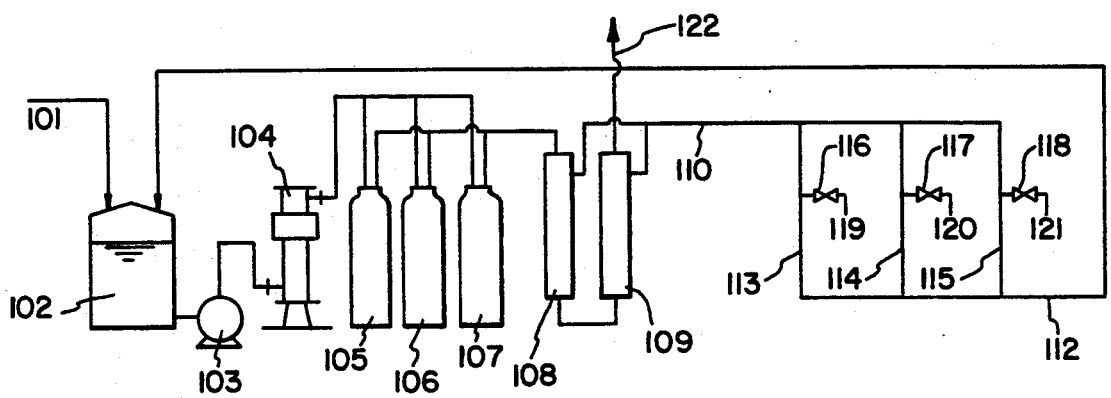
FIG. 3 is a schematical drawing of ultra-pure water manufacturing equipment.

FIG. 2 is a drawing to show a part of simple piping system to explain the calculation example. 301 refers to a an outward pipe, 302 an inward pipe, 303 upstream from the branching point of the connection pipe, and 304 downstream from the branching point of the connection pipe, 305 denotes the branching point from outward pipe to connection pipe, 306 a junction of connection pipe with inward pipe, and 307 a branching point from the connection pipe to the branching valve 308.

Here, it is assumed that the length of connection pipe 303 and that of connection pipe 304 are 2 m each respectively. Supposing that inner diameter of connection pipe 303 is 20 mm, the flow rate and pressure loss in pipe when pipe inner diameter of connection pipe 304 is changed is calculated. To simplify the calculation, only the pressure loss of straight pipe is taken into consideration. If there is a bent portion, pressure loss of the bent portion is multiplied by itself.

Calculation procedure is as follows: First, the quantity of water flowing in connection pipe when the branching valve 306 is closed is estimated for a given pipe diameter. This is supposed to be $q_1$. In this case, pressure loss between the branching point 305 and the junction 306 in FIG. 2 can be calculated by the equations (1), (2) and (3). This value is supposed as $\Delta P_1$.

Next, the branching valve 308 is opened to supply ultra-pure water to the use points. In this case, however, it is assumed that the pressure loss between the branching point 305 and the junction 306 is maintained to the value of pressure loss $\Delta P_1$ previously obtained. When the branching valve 308 is gradually opened to increase the flow rate passing through the valve 308, the quantity of water flowing in the connection pipe 303 is increased, and the water flowing in 304 is decreased. Thus, pressure loss generated at the connection pipe 303 is increased, and pressure loss generated at 304 is decreased. However, because total value agrees with the value $\Delta P_1$ as previously obtained, the pressure loss generated at the connection pipe 303 becomes equal to $\Delta P_1$ with the increase of flow rate in the branch flow, and the condition not to generate pressure loss exists in the connection pipe 304. This means that water does not flow in the connection pipe 304. In other words, total quantity of ultra-pure water flowing into the connection pipe from outward pipe 301 flows to the use points, and that no ultra-pure water flows in inward pipe. The flow rate of the branch flow giving this condition is called the maximum branch flow rate. This flow rate can be calculated by the equations (4), (5) and (6) because pressure loss at the connection pipe 303 is equal to $\Delta P_1$. When the flow rate of the branch flow is increased to higher than the maximum branch flow rate, pressure loss generated at the connection pipe 304 is turned to negative, and the flow running from the junction 306 to the branching point 307 is generated. This is the condition for reverse flow.

In the ultra-pure water piping system, it is necessary to maintain the minimum flow velocity at 0.3 m/s in order to prevent the proliferation of microorganisms. If the branch flow rate when the flow velocity in the connection pipe 304 is 0.3 m/s is named as optimal branch flow rate, this can be obtained as follows: The pressure loss generated at the connection pipe 304 can be calculated from the flow velocity of 0.3 m/s. Because the difference between this and $\Delta P_1$ is the pressure loss generated at the connection pipe 303, the flow rate in the connection pipe 303 can be calculated. The difference between water quantity flowing in the connection pipe 303 and the water quantity flowing in the connection pipe 304 is the optimal branch flow rate.

Table 1 shows the results when maximum branch flow rate and optimal branch flow rate were obtained by the above procedure in various combinations of pipe diameters. The values of the flow velocity upstream and downstream of the branching point of the connection pipe under various conditions are also given in Table 1.

From the calculation example in Table 1, it is evident that the optimal branch flow rate is not very high compared with the water quantity flowing in the connection pipe in case pipe diameters upstream and downstream from the branching point of the connection pipe are the same and that, f the flow rate is low when there is no branch flow, it is not possible to flow at optimal branch flow rate. In contrast, when the pipe diameter downstream is smaller than that of upstream from the branching point of the connection pipe, it is possible to have optimal branch flow rate even when the flow rate in connection pipe without branch flow is low. Thus, reverse flow from the inward pipe is not likely to occur. However, when the ratio of pipe diameters increases, the flow velocity in the connection pipe increases regardless of whether there is branch flow or not, and the load is increased. On the other hand, because the outward pipe is by about 4 m at higher position than the inward pipe and the connection pipe connects between them, this is equal to the case where the pressure difference corresponding to water head between the outward pipe and the inward pipe is applied between inlet and outlet of the connection pipe.

The water column of 4 m of water head between outward pipe and inward pipe corresponds to the pressure difference of 0.4 kg/cm$^2$. As it is obvious from the calculation example shown in Table 1, this pressure is a high enough pressure difference to pass a large quantity of ultra-pure water into the connection pipe. This suggests that, when pipe diameters upstream and downstream from the branching point of the connection pipe are changed, the increase of pressure loss generated in the connection pipe is sufficiently compensated by water head between outward pipe and inward pipe even when the ratio of pipe diameter upstream to the pipe diameter downstream is increased as high as the ratio of pipe diameters as given in Table 1.

Therefore, when the pipe diameters of connection pipes 303 and 304 are changed, the more the pipe diameter of connection pipe 304 is decreased compared with the pipe diameter of 303, the more the water quantity to ultra-pure water using equipment can be supplied by maintaining flow velocity of 0.3 m/s at the connection pipe 304. Accordingly, it is desirable to change the pipe diameters between upstream and downstream of the branching point of the connection pipe and as decrease the pipe diameter downstream to compared to the upstream pipe diameter.

The same effect as above can be obtained by installing a flow regulating valve near the junction of connection pipe with inward pipe. In this case, however, it is difficult to equalize water quantity flowing in a plurality of connection pipes. Also, the same effect can be expected by installing the pipe with smaller diameter in a part of the pipe downstream from the branching point of the connection pipe, but it is impossible to always maintain the lowest flow velocity at all portions. Namely, when flow is branched off, it is impossible to maintain the flow velocity at the portion other than the portion with smaller diameter downstream from the branching point of the connection pipe.

Further, when the branching valve 308 is opened in FIG. 2, it is necessary to control the flow rate of the flow branching off from the branching valve to obtain the above effect. In the valves, in which the pressure at the branching point 307 becomes nearly equal to the atmospheric pressure when branch flow may have excessive flow rate, and the lowest flow velocity cannot be maintained in the connection pipe 304. For this reason, the branching valve must be the valve of such structure as to control maximum flow rate. Such valve may be a diaphragm valve to freely control the opening on branch flow side or a 3-way valve having smaller pipe diameter on branch flow side.

Design Procedure of Piping System

It is supposed that the flow rate of the branch flow to the ultra-pure water using equipment through the branching valve 308 is $q_u$ (m$^3$/s). $q_u$ is determined by the specification of ultra-pure water using equipment. If it is supposed that the pipe diameter of connection pipe 303 is $d_{u1}$ (m), the pipe diameter of 304 is $d_{u2}$ (m), average flow velocity at 303 when water is not branched off through the branching valve 308 is $v_{u1}$ (m/s), and average flow velocity at 304 is $v_{u2}$ (m/s), then, $$\pi(d_{u1}/2)^2 \times v_{u1} = \pi(d_{u2}/2)^2 \times v_{u2} \quad (7)$$

because flow rate is constant in the connection pipe. If it is supposed that average flow velocity in the connection pipe 303 is $v'_{u1}$ when water quantity $q_u$ (m$^3$/s) is branched off from the branching point by maintaining the average flow velocity in the connection pipe 304 at 0.3 m/s, the following relation is obtained:

$$\pi(d_{u1}/2)^2 + v'_{u1} = q_u + \pi(d_{u2}/2)^2 \times 0.3 \quad (8)$$

The left-hand member of the equation (8) represents the quantity of water flowing into connection pipe from outward pipe when ultra-pure water is used at the use points. namely, the left-side member of the equation (7) shows minimum value of the water quantity flowing into the connection pipe from outward pipe, and the left-hand member of the equation (8) shows maximum value.

The water quantity flowing into connection pipe must be more than the water quantity to be used $q_u$ when ultra-pure water is used. If it is supposed that multiplication factor is P, then $$\pi(d_{u1}/2)^2 \times v'_{u1} = q_u + \pi(d_{u2}/2)^2 \times 0.3 = P \times q_u \quad (9)$$

Therefore, $d_{u2}$ can be obtained as follows:

$$d_{u2} = 2\{(P-1) q_u / 0.3 \pi\}^{\frac{1}{2}} \quad (10)$$

When this is substituted in the equation (7), $$\pi(d_{u1}/2)^2 \times v_{u1} = \pi\{(P-1)q_u/0.3\pi\} \times v_{u2} \quad (11)$$

From the equations (9) and (11), $$v'_{u1}/v_{u1} = (P \cdot q_u)/\{(P-1)q_u \times v_{u2}/0.3\} \quad (12)$$

The equation (12) shows the ratio of flow velocity change at the portion upstream of the branching point of connection pipe between the case where ultra-pure water is branched off and the case where it is not branched off. When this value is high, it means that the change of water quantity flowing in connection pipe is high. If the change is abrupt, a phenomenon called water hammer occurs, and pipe is vibrated and often damaged. Because vibration must be strictly excluded from the process to draw ultra-fine patterns as in the process to produce semiconductor IC, such phenomenon is an obstacle for the manufacturing process even when the pipe is not damaged. For this reason, the value of the equation (12) must be preferably 2 or less, and 3 at maximum.

$$v'_{u1}/v_{u1} = \{(P/(P-1)\} \cdot (0.3/v_{u2}) < 3 \quad (13)$$

The same applies to downstream from the branching point of connection pipe. Hence, $$v_{u2}/0.3 < 3 \quad (14)$$

From the equation (14), $$v_{u2} < 0.9 \text{ [m/s]} \quad (15)$$

If this is substituted in the equation (13), $$P/(P-1) < 9$$

Therefore, $P > 1.125$.

If it is supposed that P is 1.2, then the following relation is obtained from the equation (9):

$$\pi(d_{u1}/2)^2 \times v'_{r1} = 1.2 q_u \quad (16)$$

$$\pi(d_{u2}/2)^2 \times 0.3 = 0.2 q_u \quad (17)$$

Also, the equation (13) is turned to:

$$v'_{u1}/v_{u1} = (1.2/0.2) \cdot (0.3/v_{u2}) < 3$$

Therefore, $$v_{u2} > 0.6 \text{ m/s}$$

When this is joined with the equation (15), $$0.6 < v_{u2} < 0.9 \text{ [m/s]} \quad (18)$$

Hence, $$2 < v'_{u1} v_{u1} < 3 \text{ [m/s]} \quad (19)$$

In other words, if $v_{u1}$, $v'_{u1}$ and $v_{u2}$ are within this range, the change of flow rate in connection pipe is comparatively mild and water hammer can be suppressed to lower degree even when the change of flow rate is rapid and sudden between the case where ultra-pure water is used and the case where it is not used.

Therefore, the piping system must be designed in such manner that the flow velocity in connection pipe satisfies the relation of the equations (18) and (19). The values of $d_{u1}$, $d_{u2}$, $v_{u1}$ and $v'_{u1}$ are determined by the equations (16), (17) and (19) in connection with the flow rate of water to be used $q_u$.

On the other hand, minimum value and maximum value of the water flowing into the connection pipe from outward pipe are given by the equations (7) and (8) respectively. Suppose that the total number of connection pipes is n, the number of pipes in use is m, and the number of those not in use is (n−m). Then, the quantity of ultra-pure water Q (m$^3$/s) to be supplied to the inlet of outward pipe is:

$$Q = m \times \pi(d_{u1}/2)^2 V_{u1} + (n-m) \times \pi(d_{u1}/2)^2 v_{u1} \quad (20)$$

When S is supposed to be simultaneous operation rate of connection pipe and it is defined as:

$$S = m/n$$

and the relationship of the equation (19) is substituted in the equation (20), the following relationship is obtained as the range of supply water quantity:

$$n(2S + 1) \cdot \pi(d_{ul}/2)^2 v_{ul} > Q > n(S + 1) \cdot \pi(d_{ul}/2)^2 v_{ul}$$

This means that the water quantity to be passed into outward pipe, i.e. the production water quantity of ultra-pure water production equipment necessary for the combination of a pair of outward pipe and inward pipe, is determined according to the number of connection pipe, simultaneous operation rate, and water quantity flowing into connection pipe when ultra-pure water is not used.

Now, an example is taken in a piping system, which is to supply ultra-pure water to 10 units each using 0.5 m³/h of ultra-pure water. It is supposed that the length of connection pipe is 2 m in the portion upstream ($l_1$) from the branching point to branch off ultra-pure water, and 2 m on the portion downstream ($l_2$), and that simultaneous operation rate is 0.5. In the following, the calculation procedure is described in detail.

(1) To Determine Pipe Diameter of Connection Pipe

In case water quantity flowing to the portion upstream from the branching point of outward pipe is 0.5 m³/h, it is supposed that water is passed at 0.5 m³/h × 0.2 by maintaining the flow velocity of 0.3 m/s on the portion downstream from the branching point of outward pipe. If the pipe diameter of the portion downstream is $d_{u2}$ (m), the following relationship is obtained from the equation (17):

$$0.3 \times \pi(d_{u2}/2)^2 = 0.1/3600 \ [m^3/s]$$

Therefore, $$d_{u2} = 0.0109 \ [m]$$
$$= 1.09 \ [cm]$$

The pipe of this value may be used, but there is normally standard dimension for the pipe. Accordingly, if the value closest to this value, i.e., 13 mm, is selected from the standard of pipe, the water quantity flowing when used is 0.14 m³/h. Water quantity flowing into connection pipe from outward pipe is:

$$0.5 + 0.14 = 0.64 \ [m^3/h]$$

If the flow velocity upstream from the branching point of connection pipe is 1 m/s, and if pipe diameter is supposed to be $d_{u1}$, then $$1 \times \pi(d_{u1}/2)^2 = 0.64/3600 \ [m^3/h]$$

Hence, $$d_{ul} = 0.015 \ [m]$$
$$= 1.5 \ [cm]$$

(2) To Obtain Pressure Difference Between Outward Pipe and Inward Pipe

When the water is flowing at the above flow rate, pressure loss generated on the connection pipe can be calculated from the equations (1), (2) and (3) as follows:
On the portion upstream from the branching point:

$$\Delta P_1 = 0.0189 \ kg/cm^2$$

On the portion downstream from the branching point:

$$\Delta P_2 = 0.0029 \ kg/cm^2$$

In total, $$\Delta P = 0.0218 \ kg/cm^2$$

(3) To Confirm Flow Velocity When Ultra-pure Water is not Used

When it is supposed that:

$$\Delta P = 0.0218 \ kg/cm^2$$

$$d_1 = 0.015 \ m$$

$$d_2 = 0.013 \ m$$

$$l_1 = 2 \ m$$

$$l_2 = 2 \ m$$

It is confirmed whether the flow velocity ($v_1$) upstream from the branching point of connection pipe is 0.3 m/s or more or not.
If $$v_1 = 0.3 \ [m/s]$$

the flow velocity ($v_2$) downstream from the branching point is:

$$v_2 = 0.3 \times (0.015/0.013)^2 = 0.399 \ [m/s]$$

If the total pressure loss is smaller than the pressure difference ($\Delta P = 0.0218 \ kg/cm^2$) as previously obtained under this condition, minimum flow velocity should be maintained. By the equations (1), (2) and (3), it is calculated as follows:

$$\Delta P = \Delta P_1 + \Delta P_2$$
$$= 0.00239 + 0.00469$$
$$= 0.00709 \ [kg/cm^2]$$

This value is low enough from the above pressure loss. Thus, it is judged that the flow velocity upstream from the branching point of connection pipe is 0.3 m/s or more.

On the other hand, by numerical calculation using the equations (1), (2) and (3), the water quantity flowing into connection pipe when ultra-pure water is not used at the above pressure difference of 0.0218 kg/cm² is calculated as:

$$0.368 \ m^3/h.$$

(4) Accordingly, the water quantity Q to be supplied to the outward pipe is calculated as follows:

$$10(2 \times 0.5 + 1) \times 0.368 > Q$$

$$> 10(0.5 + 1) \times 0.368 \ [m^3/h]$$

Namely, $7.36 > Q > 5.52 \ [m^3/h]$

Thus, the capacity range of ultra-pure water supply equipment is determined.

If the quantity of ultra-pure water to be used is at the use points and the number of the use points are determined, it is possible to design a piping system, which can supply ultra-pure water to the ultra-pure water using equipment without reverse flow or mixing of contaminated ultra-pure water from inward pipe, and the capacity of ultra-pure water producing equipment can be determined. Thus, design theory for an ultra-pure water supply piping system has been established for the first time.

Figure 4:
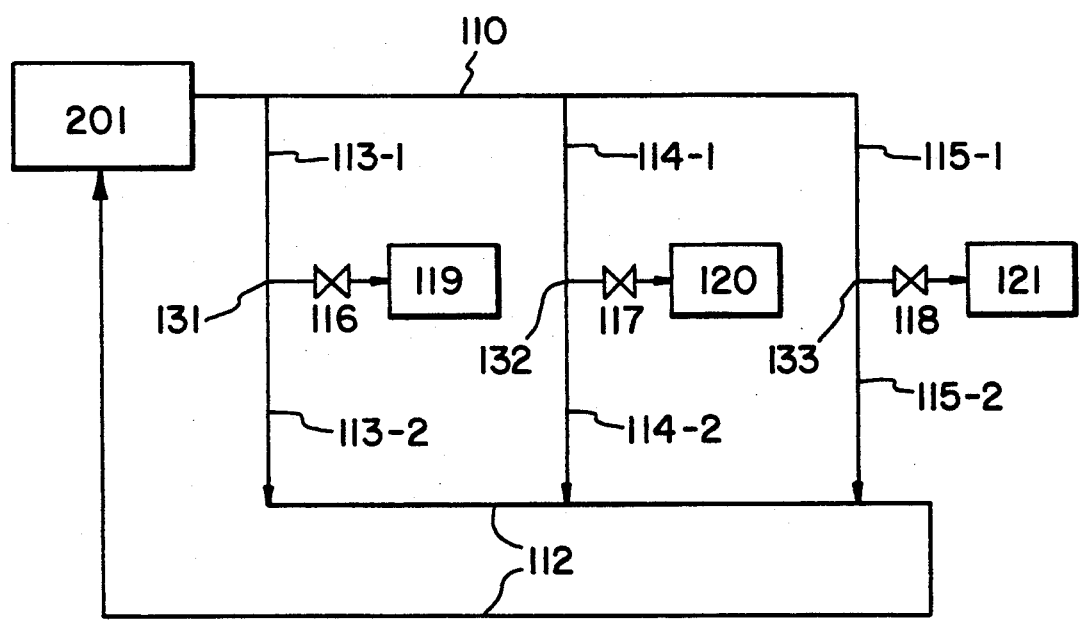
FIG. 4 is a schematical drawing of the ultra-pure water supply piping system of FIG. 3.

In FIG. 2 and FIG. 4, only one use point is connected with one connection pipe, whereas there may be two or more use points. In such case, the pipe diameter of connection pipe should be gradually narrowed down from outward pipe only when it passes by each branching point.

Also, the branching point of outward pipe and connection pipe as well as the junction of connection pipe and inward pipe are simply shown by T-shaped joint in FIG. 2, and it is also effective to install branching valve without dead space. In this case, the branching valve is normally used in opened state. Ultra-pure water is flowing under such condition that there is almost no dead space in outward pipe and inward pipe. There is no influence on the other use points if modification and repair are carried out by closing the branching valves of connection pipe, outward pipe and inward pipe only when it is necessary to change the use points or to carry out construction and repair. As it is self-explanatory from this, it is effective to install the branching valves in advance on outward pipe and inward pipe at the position where the increased installation of ultra-pure water using equipment is expected. Thus, it is possible to connect the new ultra-pure water using equipment without giving influence on the other use points. Of course, connection must be performed after sufficient cleaning and drying are carried out on inner surface of the pipe on the newly installed portion.

In the above, description has been given on a system, which supplies ultra-pure water from ultra-pure water final purification system to a pair of outward pipe and inward pipe, while it goes without saying that the present invention can be applied to the combination of two pairs or more of outward pipe and inward pipe.

The Best Arrangement to Execute the Invention

An embodiment of this invention is shown in FIG. 1. FIG. 1 shows a simplified sectional view of a clean room. The air introduced from the air inlet 401 passes through a paper filter 402. After dust is thus removed, the air goes down the clean room and is pushed to the underfloor clean pit through the grating floor 403 and is sent to 401 through the return air space from the exhaust unit 404. This is a normal structure of a clean room.

Ultra-pure water is supplied to the outward pipes 405 and 406 by the final purification system and joins the inward pipe 409 after passing through the connection pipes 407 and 408. Then, it is returned to the final purification system from 410, and is purified and circulated. To the ultra-pure water using equipment, water is supplied through the branching valve 411, which can control the flow rate. The example in FIG. 1 has two use points.

Of the connection pipes, pipe diameter of the pipe 408 downstream from the branching point is smaller than that of the pipe 407 upstream. To the inner diameter of 20 mm of 407, that of 408 is 15 mm.

In each of the connection pipes, water flows at flow rate of 0.5 $m^2/h$. The pressure of ultra-pure water supplied to the inlets of outward pipes 405 and 406 from the final purification system may be lower than the pressure necessary for the ultra-pure water using equipment 412 by water head between the branching valve 411 and the outward pipe. When the branching valve 411 is opened in such piping system, the resistivity of ultra-pure water supplied to the ultra-pure water using equipment 412 agrees with the resistivity of ultra-pure water supplied to 405. Namely,

| Resistivity | 18.25 ± 0.005 MΩ · cm |
|---|---|
| Silica | 1–2 ppb |
| TOC | 4–5 ppb |
| Total evaporation residue | 1–2 ppb |
| Particles | 0.2 pc. or less/cc (>0.1 μm) |
| Bacteria | 0 pc./liter |

Industrial Applicability

As described above, it is possible by the ultra-pure water supply piping system of this invention to prevent the decrease of purity due to joining or intermingling of ultra-pure water in the piping system as often seen in conventional type equipment and also to supply the water in ultra-high purity to the ultra-pure water using equipment. In other words, it is possible by ultra-pure water supply piping system of this invention to supply ultra-pure water suitable for the production in an era of 64 Mbit memory.

TABLE 1

Effect of branch flow rate according to pipe diameter of connection pipe (Calculation examples)

| Connection pipe diameter [mmφ] | Upstream 20 | | | Upstream 20 | | | Upstream 20 | | |
|---|---|---|---|---|---|---|---|---|---|
| | Downstream 20 | | | Downstream 15 | | | Downstream 10 | | |
| Flow rate when not branched off $q_1$ [$m^3/h$] | 1 | 0.5 | 0.3 | 1 | 0.5 | 0.3 | 1 | 0.5 | 0.3 |
| Flow velocity upstream [m/s] | 0.88 | 0.44 | 0.27 | 0.88 | 0.44 | 0.27 | 0.88 | 0.44 | 0.27 |
| Flow velocity downstream [m/s] | 0.88 | 0.44 | 0.27 | 1.57 | 0.78 | 0.47 | 3.54 | 1.77 | 1.06 |
| Pressure loss $\Delta P_1$ [kg/$cm^2$] | 0.021 | 0.064 | 0.003 | 0.052 | 0.016 | 0.0065 | 0.299 | 0.089 | 0.036 |
| Maximum branch flow rate [$m^3/h$] | 1.4 | 0.79 | 0.45 | 2.6 | 1.24 | 0.79 | 6.7 | 3.4 | 2.0 |
| Flow velocity upstream [m/s] | 1.23 | 0.70 | 0.40 | 2.3 | 1.1 | 0.70 | 5.9 | 3.0 | 1.8 |
| Flow velocity downstream [m/s] | 0 | 0 | 0 | 0 | 0 | 0 | 0 | 0 | 0 |
| Optimal branch flow rate [$m^3/h$] | 0.86 | 0.34 | — | 2.18 | 0.94 | 0.40 | 6.47 | 3.08 | 1.78 |
| Flow velocity upstream [m/s] | 1.20 | 0.55 | — | 2.10 | 1.00 | 0.52 | 5.80 | 2.80 | 1.65 |

TABLE 1-continued

| | Effect of branch flow rate according to pipe diameter of connection pipe (Calculation examples) | | | | | | | |
|---|---|---|---|---|---|---|---|---|
| | Upstream | | | | | | | |
| | 20 | | | 20 | | | 20 | |
| Connection pipe | | Downstream | | | | | | |
| diameter [mmφ] | | 20 | | | 15 | | | 10 |
| Flow velocity downstream [m/s] | 0.3 | 0.3 | — | 0.3 | 0.3 | 0.3 | 0.3 | 0.3 |

What we claim is:

1. An ultra-pure water piping system for conveying ultra-pure water from a source of supply to a plurality of ultra-pure water using units, said piping system comprising:

an outward pipe adapted to conduct a flow of ultra-pure water therethrough;

an inward pipe extending in a direction generally parallel to said outward pipe and adapted to conduct a flow of ultra-pure water in the same direction as said outward pipe, said inward pipe located below said outer pipe;

a plurality of connection pipes connecting said outward pipe to said inward pipe, each said plurality of connection pipes being connected to said outward pipe at connection points which are located above said inward pipe;

a plurality of branching pipes connecting each of said plurality of connection pipes to one of said ultra-pure water using units, said branching pipes connected to said connection pipes at respective branching points; and a branching valve connected in each said branching pipe for controlling the flow rate of water flowing in said branching pipes.

2. An ultra-pure water supply piping system according to claim 1, wherein the pipe diameter of each said connection pipes upstream of its associated said branching point is greater than the connection pipe diameter downstream of said associated branching point.

3. An ultra-pure water supply pipe system according to claim 1, wherein said branching valve controls the flow rate so that, when said branching valve is open, the pressure in said branching pipe is higher than the pressure in said inward pipe.

4. An ultra-pure water supply piping system according to claim 1, including two or more pairs of outward pipes and inward pipes for distributing ultra-pure water from a supply of ultra-pure water to said ultra-pure water using units.

5. An ultra-pure water supply system according to claim 1, wherein one said connection pipes is contained in a said ultra-pure water using unit.

6. An ultra-pure water supply piping system according to claim 1 which is adapted to be installed in a clean building consisting of 3-layer structure including a ceiling unit to remove dust sufficiently and to blow out clean air at regulated temperature, a clean room and an underfloor clean pit, and wherein said outward pipe may be located at ceiling height, and said inward pipe may be located in said clean pit.

7. An ultra-pure water supply piping system according to claim 1, including a plurality of said branching pipes are connected to one of said connection pipes.

8. An ultra-pure water supply piping system according to claim 7, wherein the pipe diameter of said one connection pipe is gradually decreased at each branching point.

9. An ultra-pure water supply piping system according to claim 1, wherein said outward pipe, said inward pipe and said connection pipes are made of clean vinyl chloride, PVDF or PEEK.

10. An ultra-pure water supply piping system according to claim 1, wherein said outward pipe, said inward pipe and said connection pipes are made of stainless steel having a passive film mostly consisting of $Cr_2O_3$ on its inner surface.

* * * * *